July 4, 1933.  O. F. EWERT  1,916,259
HOB
Filed Aug. 3, 1931   2 Sheets-Sheet 1

INVENTOR
Otto F. Ewert
BY
ATTORNEYS

July 4, 1933.     O. F. EWERT     1,916,259
HOB
Filed Aug. 3, 1931     2 Sheets-Sheet 2
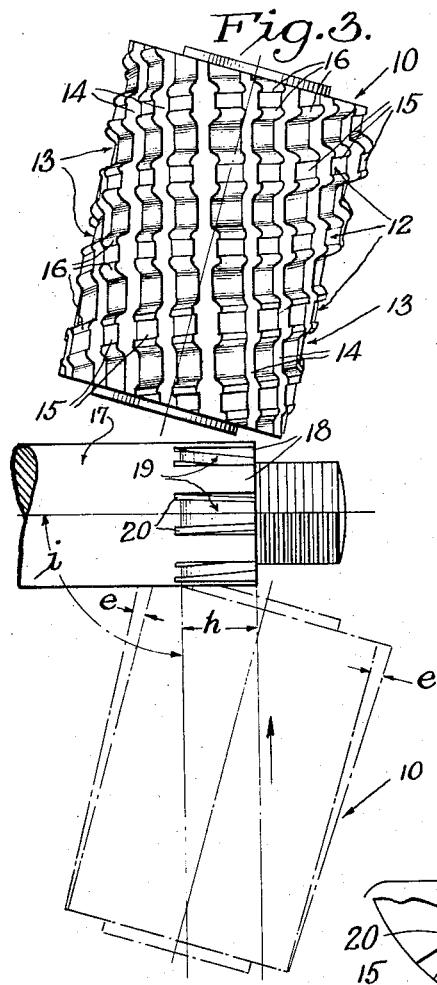
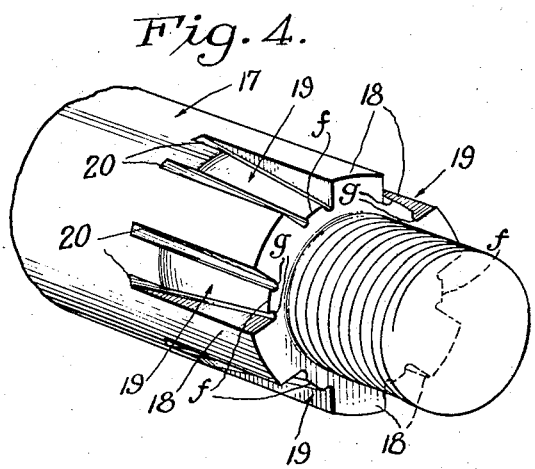
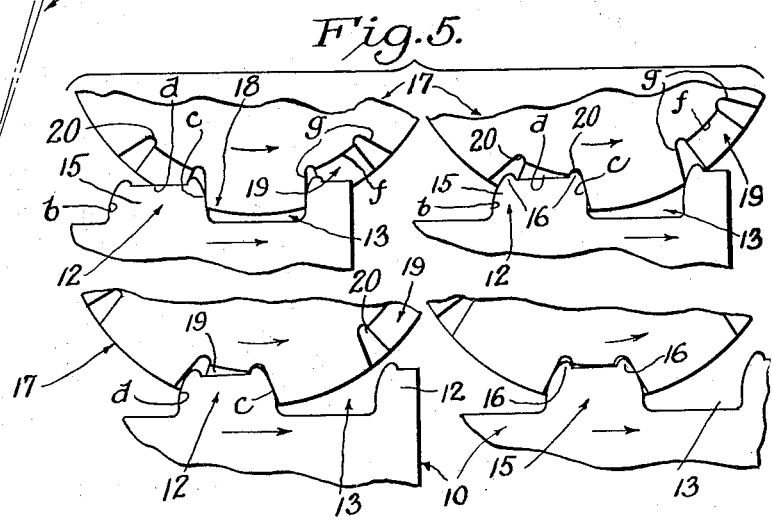
INVENTOR
*Otto F. Ewert*
BY
*Chindell Parker Nielson*
ATTORNEYS Patented July 4, 1933

1,916,259

UNITED STATES PATENT OFFICE

OTTO F. EWERT, OF GENOA CITY, WISCONSIN

HOB

Application filed August 3, 1931. Serial No. 554,626.

The present invention relates to improvements in hobs.

The primary object of the invention resides in the provision of a novel hob adapted for generating teeth or keys with tapered bases, such for example as the keys on the inside member or shaft of a tapered spline coupling.

A more specific object is to provide a new and improved hob adapted for generating spline keys of the foregoing character that are parallel, that have tapered bases concentric in cross-section to the axis of the spline member, and that have clearance grooves along the longitudinal edges of their roots.

Other objects and advantages will become apparent as the description proceeds.

In the accompanying drawings, Figure 1 is a perspective view of a hob embodying the features of my invention, the hob being shown in the position it occupies relative to a tapered spline shaft, illustrated in full outline, when cutting to full depth, and in the position it occupies when about to part from the shaft, illustrated in dotted outline.

Fig. 3 is a diagrammatic view illustrating the use of the hob.

Fig. 4 is a fragmentary perspective view of a tapered spline shaft generated by the hob.

Fig. 5 is a diagrammatic representation, consisting of four views, illustrating successive steps in the generating action.

Figure 1:
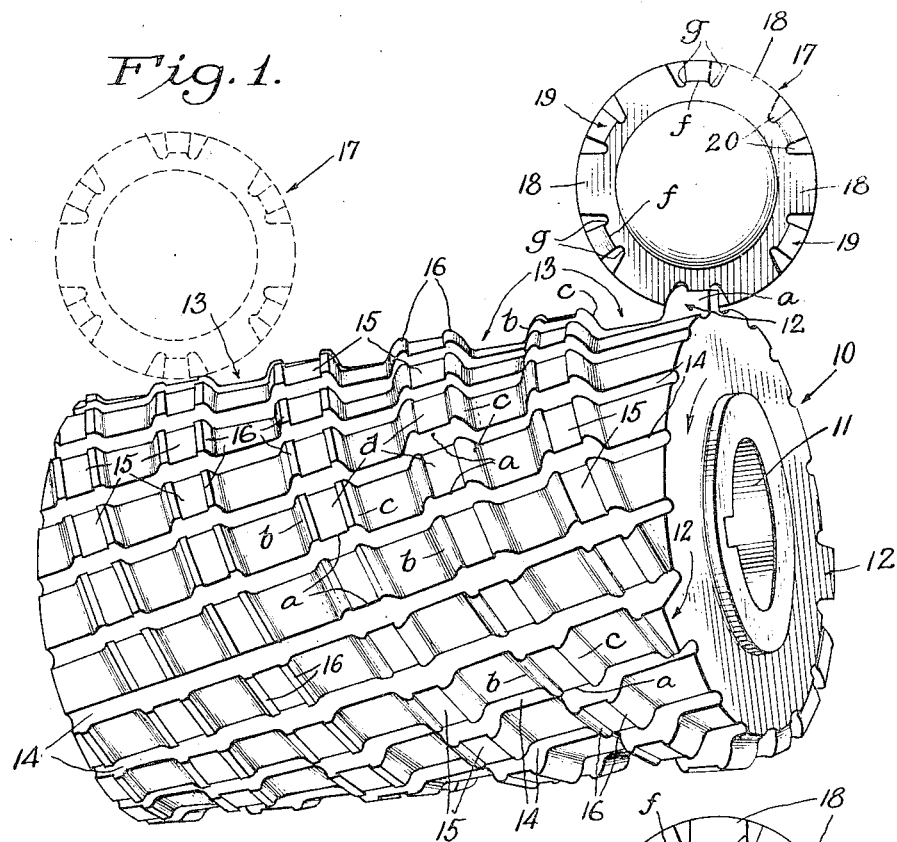

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the hob constituting the exemplary embodiment of the invention comprises a cylindrical body 10 having the usual axial bore 11 for the reception of the drive shaft (not shown). The hob may have any suitable number of threads, but preferably is of the multiple-thread type. In the present instance, three threads 12, defined by helical grooves 13 and intersected by flutes or gashes 14 extending generally longitudinally of the body 10, are shown. Preferably, the gashes 14 are inclined longitudinally of the body 10 into substantially perpendicular relation to the threads 12. Obviously, the threads 12 consist of series of hob teeth 15, each of which comprises a cutting face $a$, sides $b$ and $c$ and a top $d$. The hob teeth 15 are backed-off to provide a suitable relief for the cutting edges, and preferably a spiral relief is formed so that in sharpening the hob, the faces $a$ can be ground without altering the effective cutting contour. The hob teeth 15 also are formed with a contour adapted to cut any desired predetermined contour, and where keys with straight parallel sides are to be generated, as illustrated herein, the sides $b$ and $c$ of the teeth are involute.

Figure 2:
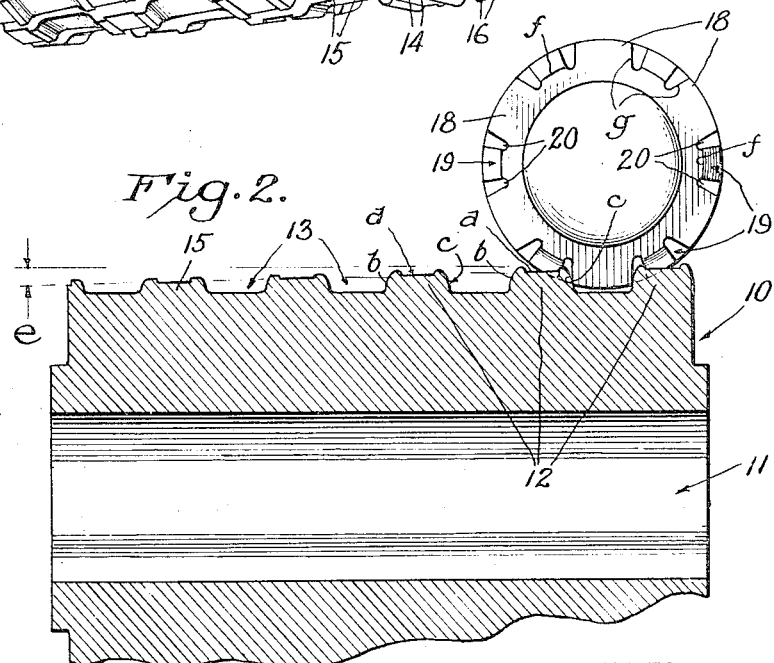
Fig. 2 is a fragmentary axial sectional view of the hob shown in operative relation to the spline shaft.

The threads 12 are tapered from one end of the body 10 to the other. As result, the hob is tapered longitudinally as clearly shown in Fig. 2, the taper being indicated by the angle $e$. The tops $d$ of the hob teeth 15 are inclined laterally in axial planes of the hob in accordance with the taper.

One of the primary features of the invention resides in the provision of ribs or clearance lugs 16 on the tops $d$ along the side edges of the teeth 15. These projections follow the taper of the hub threads. Since the threads 12 are wrapped around a cylindrical body, the tops of the teeth increase in width in accordance with the taper from the large end to the small end of the hob. Preferably, the clearance lugs 16 are uniform in width, and hence the lugs for each thread 15 are aligned in two helices diverging toward the small end of the hob.

The hob is especially adapted for generating parallel keys with tapered bases on the inside member or shaft of a spline coupling. A finished shaft 17 of this character is shown in Fig. 4, and in its preferred form comprises longitudinal keys 18 separated by interdental spaces 19. The keys 18 are parallel, that is to say, the outer longitudinal edges are parallel. The sides of each key 18 are straight and parallel, and hence the sides of the spaces 19 converge inwardly toward the axis of the shaft 17. Preferably, the keys 18 are formed in uniformly spaced relation.

The roots $f$ of the spaces 19 are tapered longitudinally of the shaft 17 to form a tapered or conical base for the keys 18. Obviously, due to the taper, the side edges $g$ converge longitudinally of the shaft. The roots $f$, in cross-section, are arcuate and are concentric to the axis of the shaft 17.

In forming the tapered spline shaft 17 from a solid cylindrical shaft section, the hob is inclined to bring the threads 12 at the operative side of the hob into parallel relation to the keys 18 to be cut, as indicated in Fig. 3. In one method, the length and taper of the hob are definitely related to the length of the shaft section to be splined. Assuming $h$ as the length of the shaft section, the hob is provided with a length such that when it occupies the proper angular position the projection of its effective length on the shaft 17 will coincide with the length $h$, and with a degree of taper such that the desired degree of taper will be produced on the shaft. The angular position of the hob as well as the length and degree of taper obviously depend on the number of hob threads 12.

For a triple-thread hob such as is shown herein, the angle $i$ subtended with the shaft 11 is relatively small, and the hob is relatively short. If a single-thread hob were used, the angle $i$ would be relatively large and the hob would be relatively long. Hence, a single-thread hob is suited best for the generation of relatively short keys 18, and where keys of substantial length are to be formed, a multiple-thread hob is most advantageous.

With the hob properly positioned, as indicated in dotted outline in Fig. 3, the hob and the shaft 17 are rotated in timed relation, and the hob is gradually fed during such rotation in a straight path at an angle to the hob axis, as for example in the direction of the arrow relatively across the axis of the shaft through cutting engagement into the position indicated in full outline in Fig. 3. The feed effects a rolling or generating action by reason of which the keys 18 and the roots of spaces 19 are correctly and accurately formed, and which avoids interference even though the roots $f$ of the keyways are tapered longitudinally of the shaft and hence variable in width and radius along the taper. The generating action is illustrated in Fig. 5.

It will be evident that as the hob axis gradually crosses the axis of the shaft 17, the spaces 19 are cut to full depth progressively from the outer end to the inner end of the shaft section $f$. By reason of the taper of the hob threads, the roots $f$ of the spaces 19 are tapered longitudinally of the shaft 17, and in cross-section are concentric to the axis.

Sharp corners cannot be formed by hobbing. The clearance lugs 16 serve to cut the clearance grooves 20, with the result that the corner edges $g$ are disposed within the conical seat defined by the roots or bases $f$. Hence, the spaces 19 are adapted to receive projections (not shown) with sharp outer corners which projections can seat securely on the roots $f$ without interference with the corners $g$.

The clearance lugs 16 being uniform in width, and aligned in diverging helices, are effective to cut the grooves 20 of uniform width throughout their length and at the proper angle relatively to each other.

I claim as my invention:

1. A tapered generating hob for generating straight longitudinal keys with tapered bases on an end of a shaft, said hob having a plurality of generally longitudinal gashes and a helical groove intersecting said gashes to form a thread of constant lead comprising a plurality of convolutions of finishing teeth, the cutting edges of said teeth being relieved, the thread being tapered in depth relative to the hob axis from one end to the other and being constant in width at the pitch line, the alined tops of successive convolutions of the thread in any axial plane of the hob being laterally inclined to fall coincident with the uniform axial taper of the hob, the length of the hob being such that when inclined at the thread angle to the shaft, the projection of the axis of the hob in an axial plane of the shaft perpendicular to an axial plane of the hob is coincident with the length of the shaft to be hobbed, and the projection of the taper of the hob in said first mentioned plane is coincident with the taper to be formed on said bases.

2. A generating hob having a plurality of longitudinal gashes and a helical groove intersecting the gashes to form a thread of constant lead comprising a plurality of convolutions of finishing teeth, the gashes being inclined longitudinally of the hob into substantially perpendicular relation to the thread, the tops of the teeth being formed along their side margins with raised lugs and between said lugs being straight in axial section, the body of the hob being cylindrical, the thread being tapered toward the body from one end to the other to provide an axially tapered hob.

3. A multiple-thread generating hob having a plurality of generally longitudinally gashes, and a plurality of helical grooves intersecting the gashes to form a plurality of threads of constant lead each comprising a plurality of convolutions of relieved finishing teeth, the threads decreasing in depth from one end to the other and being constant in width at the pitch line.

4. A generating hob having a plurality of longitudinal gashes and three helical grooves intersecting the gashes to form three threads of constant lead comprising a plurality of convolutions of relieved finishing teeth, the body of the hob being cylindrical, the threads being tapered from one end to the other toward the body to form a uniformly axially tapered hob and being constant in width at the pitch line.

5. A multiple-thread generating hob having a plurality of longitudinal gashes and a plurality of helical grooves intersecting the gashes to form a plurality of threads of constant lead comprising a plurality of convolutions of relieved teeth, the tops of the teeth being formed along their side margins with raised longitudinal lugs, the body of the hob being cylindrical, the threads being tapered toward the body from one end to the other, the tops of the threads between said lugs being straight and laterally inclined axially of the hob in accordance with the taper.

6. An axially tapered generating hob having a plurality of longitudinal gashes and a helical groove intersecting the gashes to form a thread comprising a plurality of convolutions of finishing teeth, the tops of the teeth being formed along their side margins with raised longitudinal lugs and between said lugs being straight and inclined axially of the hob in accordance with the taper.

7. A generating hob having a plurality of longitudinal gashes and a helical groove intersecting the gashes to form a thread comprising a plurality of convolutions of finishing teeth, the thread being tapered in depth relative to the hob axis from one end to the other, the tops of the teeth being formed along their side margins with abruptly raised longitudinal clearance lugs, the projections being uniform in width and being aligned in two helices diverging along the taper of the hob.

8. A tapered generating hob for generating straight longitudinal keys with tapered bases on the end of a cylindrical shaft, said hob having a plurality of generally longitudinal gashes and a helical groove intersecting said gashes to form a thread of constant lead comprising a plurality of convolutions of finishing teeth, the cutting edges of said teeth being relieved, the thread being tapered in depth relative to the hob axis from one end to the other and being constant in width at the pitch line.

9. A tapered generating hob for generating straight longitudinal keys with tapered bases on the end of a cylindrical shaft, said hob having a plurality of generally longitudinal gashes and a helical groove intersecting said gashes to form a thread of constant lead comprising a plurality of convolutions of finishing teeth, the cutting edges of said teeth being relieved, the thread being tapered in depth from one end to the other and being constant in width at the pitch line, the alined tops of successive convolutions of the thread in any axial plane of the hob being laterally inclined to fall coincident with the uniform axial taper of the hob, and clearance lugs rising abruptly from the tops of the teeth along their side margins.

10. A tapered generating hob having a plurality of generally longitudinal gashes and a helical groove intersecting said gashes to form a thread of constant lead comprising a plurality of convolutions of finishing teeth, the cutting edges of said teeth being relieved, the body of the hob being cylindrical, the thread being tapered in depth from one end to the other and being constant in width at the pitch line, the tops of the teeth being formed along their side margins with raised longitudinal lugs, said lugs being uniform in width and being alined in two helices diverging along the taper of the hob, the tops of the teeth between said lugs being straight and laterally inclined in any axial plane of the hob to coincide with the uniform taper of the hob.

In testimony whereof, I have hereunto affixed my signature.

OTTO F. EWERT.